United States Patent [19]

Broussard

[11] Patent Number: 4,567,925
[45] Date of Patent: Feb. 4, 1986

[54] SPEEDOMETER AND TACHOMETER CABLE GREASING ADAPTOR

[76] Inventor: Ronney L. Broussard, Rte. 1, Box 141, Pollock, La. 71467

[21] Appl. No.: 532,206

[22] Filed: Sep. 14, 1983

[51] Int. Cl.$^4$ ............................................. B65B 3/04
[52] U.S. Cl. ................................ 141/325; 184/105.3; 220/85 F
[58] Field of Search ............................ 141/383–386, 141/382, 346–362, 325, 326, 327; 184/105 R, 105 A, 105 B, 105 C; 220/85 F, 86 R

[56] References Cited

U.S. PATENT DOCUMENTS

| | | | |
|---|---|---|---|
| 1,515,026 | 11/1924 | Frauenfelder | 141/384 |
| 1,659,204 | 2/1928 | Klems | 141/384 |
| 1,799,433 | 4/1931 | Murphy | 141/384 |
| 1,944,191 | 1/1934 | Newmark et al. | 141/384 |

FOREIGN PATENT DOCUMENTS 230318  3/1925  United Kingdom ................ 141/384

*Primary Examiner*—Houston S. Bell, Jr.

[57] ABSTRACT

A speedometer and tachometer cable greasing adaptor enables grease to be applied into either a speedometer or tachometer cable housing in which the cable rotates. The cable housing is unscrewed from the vehicle's transmission or motor and any connecting devices are removed from the cable housing, but not the cable itself. The greasing adaptor has external threads that fit the internal threads on the bottom end of the cable housing. The threaded end of the greasing adaptor is then screwed into the threaded cable housing and is attached securely. An ordinary grease gun is then attached to the grease fitting located on the greasing adaptor. A sufficient amount of grease can then be pumped through the greasing adaptor into the cable housing without removing the cable from the housing.

16 Claims, 2 Drawing Figures

SPEEDOMETER AND TACHOMETER CABLE GREASING ADAPTOR

BACKGROUND OF THE INVENTION

The commonly used method of greasing a speedometer and a tachometer cable, in most types of vehicles, is to remove the cable housing from the rear of the speedometer or tachometer and then remove the cable from the cable housing. The cable has to be greased by hand and then replaced in the cable housing. In so doing, much of the grease has rubbed off of the cable onto the sides of the entrance to the cable housing, leaving less grease on the cable after the cable enters the cable housing.

Speedometer and tachometer cables are designed to be removed from the top end of the cable housing only. The bottom end of the cable housing is attached to either the motor or the transmission of the vehicle. In most cases, the cable housing would have to be disconnected at the motor or transmission end of the cable before the cable could be inserted fully into the top of the cable housing.

Most speedometers or tachometers are mounted on some form of a dash board, and one end of cable attached thereto. The end of the cable attached to the speedometer or tachometer is not readily accessible without removing many obstacles.

The cable and cable housing are more accessible at the bottom end connected to the motor or transmission of a vehicle. It is common to remove this end of the cable in order to reattach the cable to the speedometer or tachometer at the dash board entrance.

The invention is attached to the bottom end of the cable housing and an ordinary grease gun can be attached at the other end of the invention. Grease can then be pumped into the cable housing where the speedometer or tachometer cable rotates. Grease will fill the housing thoroughly leaving no ungreased places between the cable and the cable housing. The cable itself can be completely greased wih the invention. The invention can be removed and the cable and cable housing reattached to the motor or transmission within a matter of minutes.

This invention will benefit the owner of any vehicle having a speedometer or tachometer cable. Such cables break if they are not properly greased, and replacement can be very costly. The present method of greasing such cables is expensive because of the time required. The average person does not have the knowledge to remove the speedometer or tachometer cable from the dash entrance of a vehicle. The invention will enable the novice, as well as the professional mechanic, to quickly and efficiently grease such cables at regular intervals, avoiding replacement and high labor costs.

SUMMARY OF THE INVENTION

The apparatus of the invention consists of two parts; the main body and a grease fitting. The grease fitting is press-fitted into a first end of the main body opposite a second threaded end. A hole is centered and extends through the entire length of the main body.

There are external threads on the second main body which fit the internal threads of the speedometer and tachometer cable to be greased.

The main body, preferably made of ferrous metal, has an external knurled section opposite the threaded end which allows a firm grip by the person who is attaching the invention to the speedometer or tachometer cable housing. A press-in type fitting is preferably used to reduce cost. Alternatively, the hole of the main body can be tapped and a threaded fitting installed.

The external thread size on different sized body may be changed to fit the speedometer or tachometer cable housings. The body and the hole therein may also be reduced or enlarged as necessary to accommodate different external thread sizes. Thus, the invention can be adapted to different speedometer or tachometer cable housings.

The main body of the invention can be quickly produced in its entirety during the manufacturing process.

DETAILED DESCRIPTION OF THE INVENTION

Figure 1:
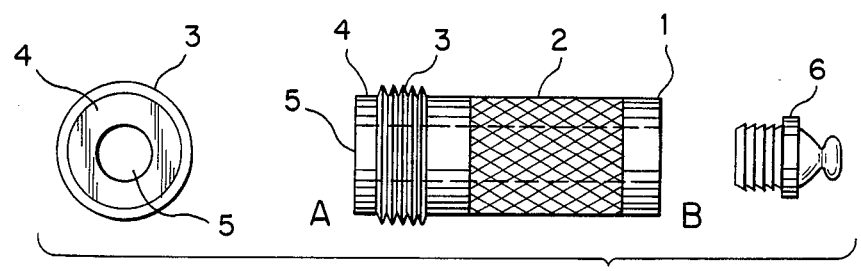
FIG. 1 is a plan view of the speedometer and tachometer greasing apparatus of the invention.
Figure 2:
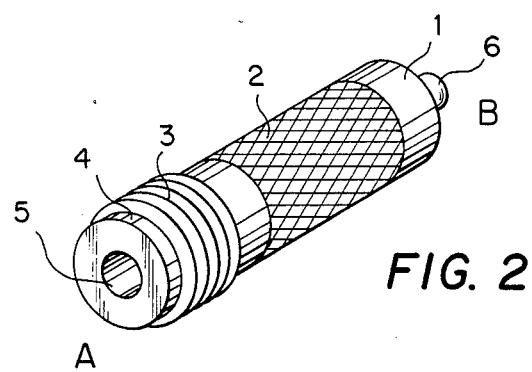
FIG. 2 is a perspective view of the speedometer and greasing apparatus of the invention.

Referring to the drawing, in FIG. 1 numeral 1 designates a one piece cylindrical body having knurled section 2 around the circumference of the body 1, a series of raised exteral threads 3 and, a short cylindrical lip 4 on end A. Hole 5 is centered in the body 1 entire length from end A to end B. A grease fitting 6 is pressed into hole 5 at end B of the main body 1.

Referring to FIG. 1, the cylindrical body 1, from end A to end B, is two inches in length. The body 1 has a three-quarters inch diameter at end A and end B; however, the diameter of the body 1 may be manufactured in various sizes to accommodate various sizes of external threads.

The knurled section 2 is one inch in length and extends completely around the circumference of the body 1. The cylindrical knurled section 2 may also be manufactured with a cross section shape of a hexagon, octagon, or square rather than a cylinder, to accommodate external leverage devices. The raised external threads 3 are seven-eights by eighteen SPECIAL FORM, having a GO GAGE length of three-eigths inch. However, external raised threads, similar to raised external threads 3, may be produced in various sizes to accommodate the internal threads of different speedometer or tachometer cable housings.

The short cylindrical lip 4 has a length of one-eighth inch from end A to end B. The hole 5 has a five-sixteenths inch diameter and is centered in the body 1. Hole 5 is two inches in length from end A to end B. Hole 5 may be reduced in diameter and grease fitting 6 may be reduced accordingly to fit hole 5.

Grease fitting 6 is preferably made to be pressed into hole 5 and securely fastened to end B of the body 1. A threaded type of grease fitting similar to grease fitting 6 may be adapted to fit hole 5 at end B of the body 1 by tapping internal threads of a desired size into hole 5 of the body 1 at end B. The body 1 is preferably made of a ferrous metal; however, it can be made of nonferrous metal or nonferrous material as well.

A transmission or motor end of a speedometer or tachometer cable housing having internal threads fitting the external threads 3 can be attached securely at end A of the body 1.

As ordinary grease gun can be attached to the grease fitting 6 at end B. Grease can be pumped through the hole 5 from end B to end A continuing into the speedometer or tachometer cable housing.

The disclosure of the invention described herein above represents the preferred embodiments of the invention; however, variations thereof, in the form, construction, and the modified applications of the invention are possible without departing from the spirit and scope of the appended claims.

I claim:

1. A two-piece apparatus for lubricating a speedometer or tachometer cable and cable housing consisting essentially of:
   a. an elongated, one-piece main body means constructed of a single, continuous piece of rigid material and having a longitudinal bore of substantially uniform cross-section for receiving and conveying grease from a grease source through said bore to a speedometer or tachometer cable housing, said main body means having a first end and a second end, said first end having threads on the outside thereof for threadable connection to internal threads located on one end of the speedometer or tachometer housing, and
   b. grease fitting means rigidly connectable to said main body means at said second end in communication with said bore, for conveying grease from a grease gun to said bore in said main body means.

2. The apparatus of claim 1 wherein said main body means is generally cylindrical in shape.

3. The apparatus of claim 2, wherein said main body means has an area on the outside surface thereof adapted for grasping by a twisting device.

4. The apparatus of claim 3 wherein said area is circular in cross-section and knurled.

5. The apparatus of claim 3 wherein said area is square in cross-section.

6. The apparatus of claim 3 wherein said area is hexagonal in cross-section.

7. The apparatus of claim 3 wherein said area is octagonal in cross-section.

8. The apparatus of claim 3 wherein said second end has cylindrical lip means connected thereto.

9. The apparatus of claim 1 wherein said hole in said first end has threads therein, and said grease fitting means has threads therein which mate with said threads in said hole in said first end.

10. The apparatus of claim 1 wherein said grease fitting means is connected to said main body means.

11. The apparatus of claim 10 wherein said grease fitting means is force fitted unto said hole in said first end of said main body means.

12. The apparatus of claim 1 wherein said apparatus is made of a ferrous metal.

13. The apparatus of claim 12 wherein said ferrous metal is selected from the group consisting of iron, steel, or stainless steel.

14. The apparatus of claim 1 wherein said apparatus is made of a non-ferrous metal.

15. The apparatus of claim 14 wherein said non-ferrous metal is selected from the group consisting of aluminum, magnesium, titanium, and brass.

16. The apparatus of claim 1 wherein said apparatus is made of plastic.

* * * * *